United States Patent
Baird et al.

(10) Patent No.: US 9,390,438 B2
(45) Date of Patent: Jul. 12, 2016

(54) SYSTEMS AND METHODS FOR CAPTURING AND REPORTING METRICS REGARDING USER ENGAGEMENT INCLUDING A CANVAS MODEL

(75) Inventors: James Baird, Seattle, WA (US); Nick Redmond, Edmonds, WA (US); Gregory Harrison, Seattle, WA (US); Brian Gebala, Seattle, WA (US); John Kawamoto, Seattle, WA (US)

(73) Assignee: COMSCORE, INC., Reston, VA (US)

( * ) Notice: Subject to any disclaimer, the term of this patent is extended or adjusted under 35 U.S.C. 154(b) by 368 days.

(21) Appl. No.: 12/963,473

(22) Filed: Dec. 8, 2010

(65) Prior Publication Data

US 2011/0137737 A1 Jun. 9, 2011

Related U.S. Application Data

(60) Provisional application No. 61/267,742, filed on Dec. 8, 2009, provisional application No. 61/267,748, filed on Dec. 8, 2009, provisional application No. 61/267,751, filed on Dec. 8, 2009.

(51) Int. Cl.
*G06Q 10/10* (2012.01)
*G06Q 30/02* (2012.01)

(52) U.S. Cl.
CPC ............ *G06Q 30/0277* (2013.01); *G06Q 30/02* (2013.01); *G06Q 30/0242* (2013.01); *G06Q 30/0248* (2013.01); *G06Q 30/0272* (2013.01)

(58) Field of Classification Search
CPC ...................................................... G06Q 30/00
USPC .......................................................... 705/14
See application file for complete search history.

(56) References Cited

U.S. PATENT DOCUMENTS

| 5,321,838 A | 6/1994 | Hensley et al. |
| 7,941,525 B1 * | 5/2011 | Yavilevich .................... 709/224 |

(Continued)

FOREIGN PATENT DOCUMENTS

| JP | 2007508776 A | 4/2007 |
| KR | 20020024719 A | 4/2002 |

(Continued)

OTHER PUBLICATIONS

Office Action dated Jun. 13, 2012 for U.S. Appl. No. 12/963,365, filed Dec. 8, 2010 (10 pages).

(Continued)

*Primary Examiner* — Eric Netzloff
(74) *Attorney, Agent, or Firm* — MH2 Technology Law Group, LLP

(57) ABSTRACT

Systems and methods for capturing user engagements with Ad content included in a webpage. An example method renders a webpage having an Ad unit within a browser on a display of a user's computer. Then, a cursor event for an Ad unit included in the rendered webpage is recorded based on cursor position relative to an area on the webpage associated with the Ad unit and the recorded cursor event is transmitted to a server via a network for reporting to interested parties. The cursor event includes an initial cursor entry event, any click actions or any hover actions, and all related timings of such events. The recordation of a cursor event is further based on location information associated with the browser within the display, the webpage within the browser and the ad area within the webpage.

20 Claims, 6 Drawing Sheets

(56) References Cited

U.S. PATENT DOCUMENTS

| | | |
|---|---|---|
| 2002/0080927 A1 | 6/2002 | Uppaluru |
| 2002/0111865 A1* | 8/2002 | Middleton et al. ............... 705/14 |
| 2003/0005430 A1 | 1/2003 | Kolessar |
| 2005/0097008 A1 | 5/2005 | Ehring et al. |
| 2005/0097088 A1 | 5/2005 | Bennett et al. |
| 2005/0177401 A1* | 8/2005 | Koeppel et al. .................... 705/4 |
| 2005/0235030 A1 | 10/2005 | Lauckhart et al. |
| 2007/0061201 A1 | 3/2007 | Ellis et al. |
| 2007/0061202 A1 | 3/2007 | Ellis et al. |
| 2008/0046562 A1* | 2/2008 | Butler ............................ 709/224 |
| 2008/0306794 A1 | 12/2008 | Cohen et al. |
| 2008/0313083 A1 | 12/2008 | Altberg et al. |
| 2009/0299862 A1 | 12/2009 | Fan et al. |
| 2009/0327869 A1* | 12/2009 | Fan et al. ....................... 715/240 |
| 2010/0005403 A1 | 1/2010 | Rozmaryn et al. |
| 2010/0088373 A1* | 4/2010 | Pinkham ................. G06Q 30/02 709/204 |
| 2011/0029393 A1* | 2/2011 | Apprendi et al. ........... 705/14.73 |
| 2011/0137733 A1 | 6/2011 | Baird et al. |

FOREIGN PATENT DOCUMENTS

| | | |
|---|---|---|
| KR | 100388152 B1 | 6/2003 |
| KR | 100532621 51 | 12/2005 |
| KR | 20060013477 A | 2/2006 |
| WO | 01/45018 A1 | 6/2001 |
| WO | 02/23304 A2 | 3/2002 |
| WO | 2011072048 A2 | 6/2011 |

OTHER PUBLICATIONS

Non-Final Office Action dated Mar. 12, 2013, U.S. Appl. No. 12/963,323, filed Dec. 8, 2010, pp. 1-28.

International Preliminary Report on Patentability dated Jun. 12, 2012, PCT Application No. PCT/US2010/059548, filed Dec. 8, 2010, pp. 1-5.

International Search Report dated Aug. 2, 2011 PCT Application No. PCT/ US2010/059525, filed Dec. 8, 2010, pp. 1-3.

Canadian Office Action dated Aug. 6, 2014, Canadian Application No. 2,783,355, pp. 1-4.

Extended European Search Report dated Oct. 27, 2014, European Application No. 10836636.0, pp. 1-9.

Extended European Search Report dated Oct. 22, 2014, European Application No. 10836640.2, pp. 1-37.

Final Office Action dated May 13, 2015, U.S. Appl. No. 12/963,323, pp. 1-65.

Non-Final Office Action dated Oct. 6, 2015, U.S. Appl. No. 12/963,323, pp. 1-62.

* cited by examiner

| EventCode | Event | uid | swfname | eventcode | location | wh | xy | vchannel | cid | publisher | pageurl | duration | extended elements |
|---|---|---|---|---|---|---|---|---|---|---|---|---|---|
| 000_000_1 | AdImpression | X | X | X |  | X | X | X | X | X |  |  | X |
| 000_000_2 | InitialInView | X | X | X | X | X | X | X | X | X | X |  |  |
| 000_000_3 | OutOfView | X | X | X | X | X | X | X | X | X | X | X |  |
| 000_000_4 | CloseUnload | X | X | X | X | X |  | X | X | X | X | X |  |
| 000_000_5 | InitialMouseEnter | X | X | X | X |  |  | X | X | X | X |  |  |
| 000_000_6 | MouseHover | X | X | X | X |  | X | X | X | X | X | X |  |
| 000_000_7 | MouseClick | X | X | X | X |  | X | X | X | X | X | X |  |
| 000_000_8 | MouseExit | X | X | X | X |  | X | X | X | X | X | X |  |
| 000_000_9 | InView | X | X | X | X | X | X | X | X | X | X |  |  |
| 000_000_10 | MouseEnter | X | X | X | X |  | X | X | X | X | X |  |  |

SYSTEMS AND METHODS FOR CAPTURING AND REPORTING METRICS REGARDING USER ENGAGEMENT INCLUDING A CANVAS MODEL

PRIORITY CLAIM

This application claims the benefit of U.S. Provisional Application Ser. Nos. 61/267,742, 61/267,748, 61/267,751 filed Dec. 8, 2009, which are hereby incorporated by reference.

BACKGROUND OF THE INVENTION

Ad placement is defined literally as "where are you placing the ad on the page". It could be at the top of the page, where it is immediately seen by the site visitor (industry vernacular: "Above the fold"), or somewhere else on the page where it is only partially visible or out of view completely (industry vernacular: "Below the fold").

"Click rate" measurements are used as the current industry standard of performance measurement for ads on websites. However, this method fails to provide a full understanding of ad placement, user engagement/interaction on a website, and how user engagement measurements can drive future creative development.

SUMMARY

The present invention provides systems and methods for capturing user engagements with Ad content included in a webpage. An example method renders a webpage having an Ad unit within a browser on a display of a user's computer. Then, a cursor event for an Ad unit included in the rendered webpage is recorded based on cursor position relative to an area on the webpage associated with the Ad unit and the recorded cursor event is transmitted to a server via a network for reporting to interested parties.

In one aspect of the invention, the cursor event includes an initial cursor entry event that is based on a first entry of the cursor into the Ad area since the webpage was rendered. The cursor event may also include amount of time the cursor was located in the Ad area, any click actions associated with the cursor while the cursor was located in the Ad area and any hover actions based on lack of movement of the cursor within in the Ad area for a predefined threshold of time.

In another aspect of the invention, the recordation of a cursor event is further based on location information associated with the browser within the display, the webpage within the browser and the ad area within the webpage.

BRIEF DESCRIPTION OF THE DRAWINGS

Preferred and alternative examples of the present invention are described in detail below with reference to the following drawings:

FIGS. 4-1, 4-2, 4-3 illustrate various Ad units with associated canvas models;

2

Figure 1:
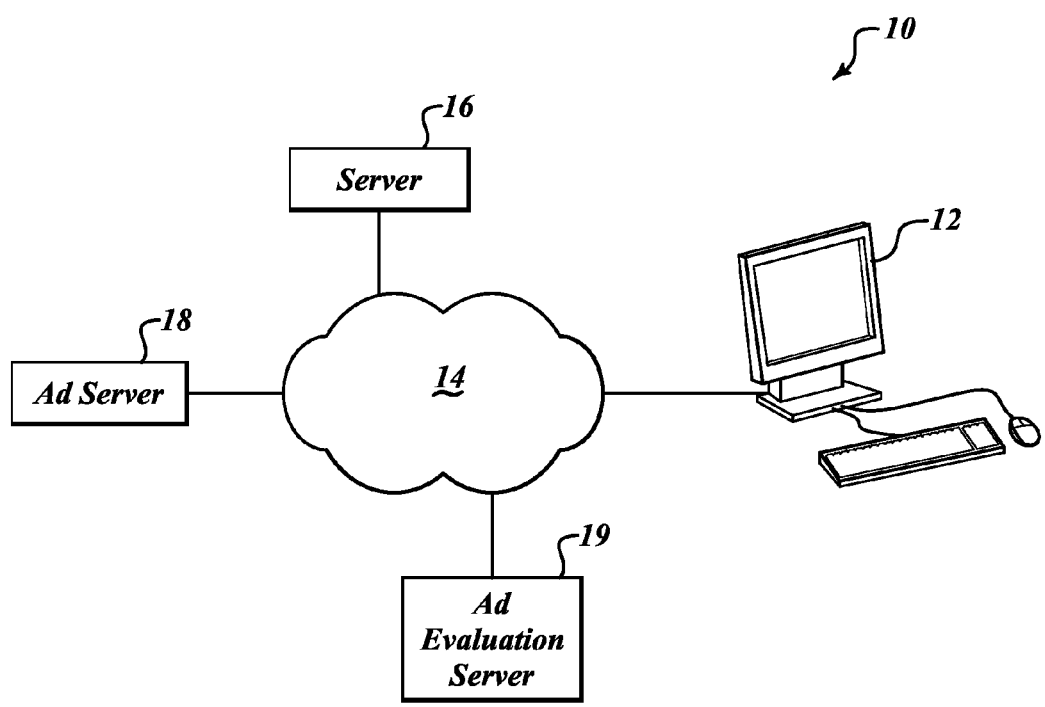
FIG. 1 illustrates a system configured to implement the present invention.
Figure 5:
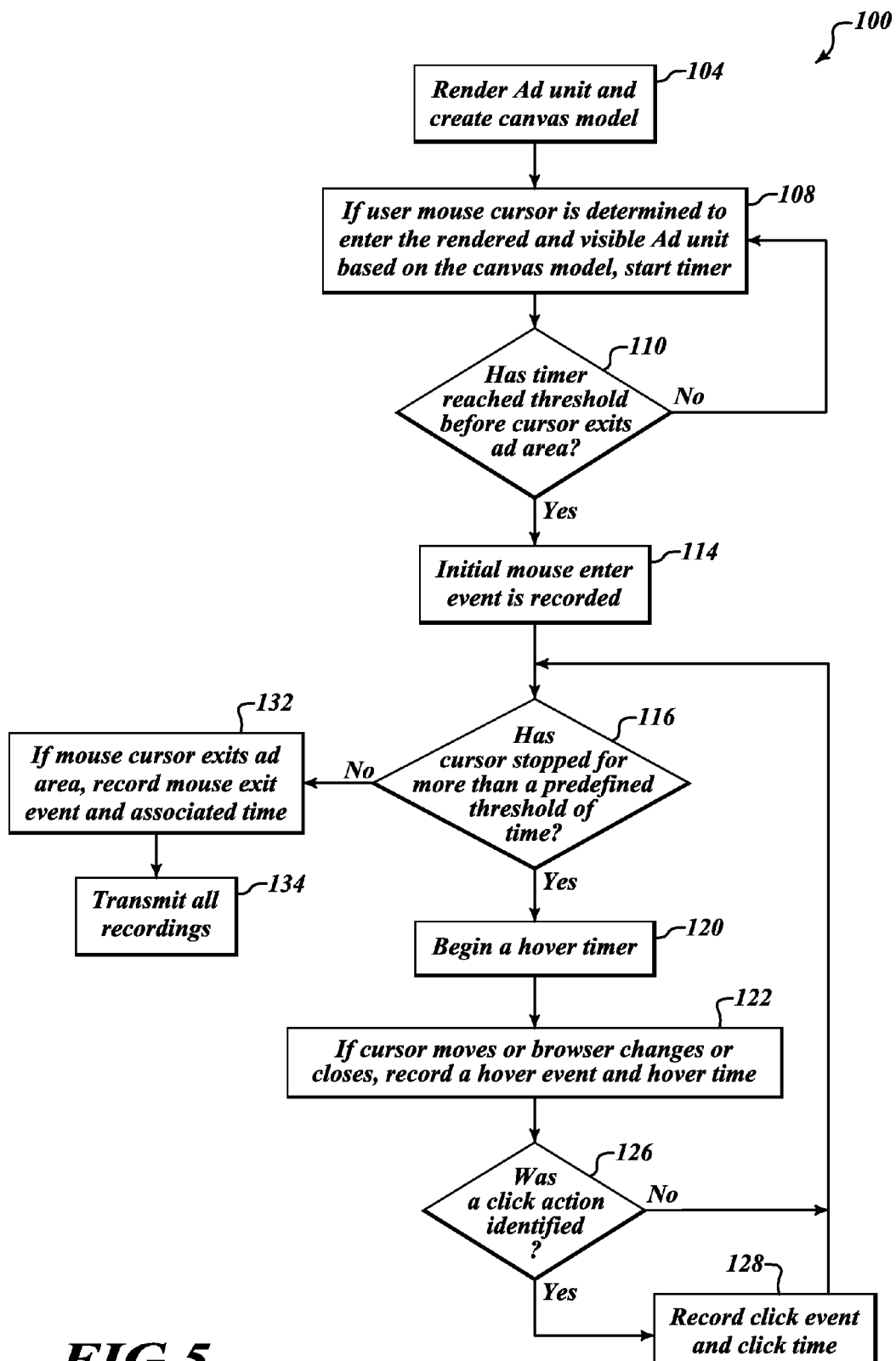

FIG. 5 illustrates a flow diagram of an example process performed by at least a portion of the system shown in FIG. 1; and FIG. 6 is a graph of events and associated data elements.

DETAILED DESCRIPTION OF THE PREFERRED EMBODIMENT

FIG. 1 illustrates an example system 10 that captures and reports metrics regarding cursor interaction with an Ad placement. The system 10 includes one or more user computer systems 12 coupled to multiple servers 16-19 over a public or private data network (e.g., the Internet) 14. A website generating server 16 produces a website that is accessible by a user via a browser on one of the user computer systems 12 over the network 14. The website includes Ad tags that instruct the browser to retrieve a corresponding advertisement (Ad unit) from an associated Ad server 18 over the network 14. The website, Ad tag or retrieved advertisement includes embedded code that determines a number of metrics associated with user interaction of the displayed advertisement. The determined metrics are then sent to an Ad evaluation server 19 and/or the other servers 16, 18 for evaluation.

Figure 2:
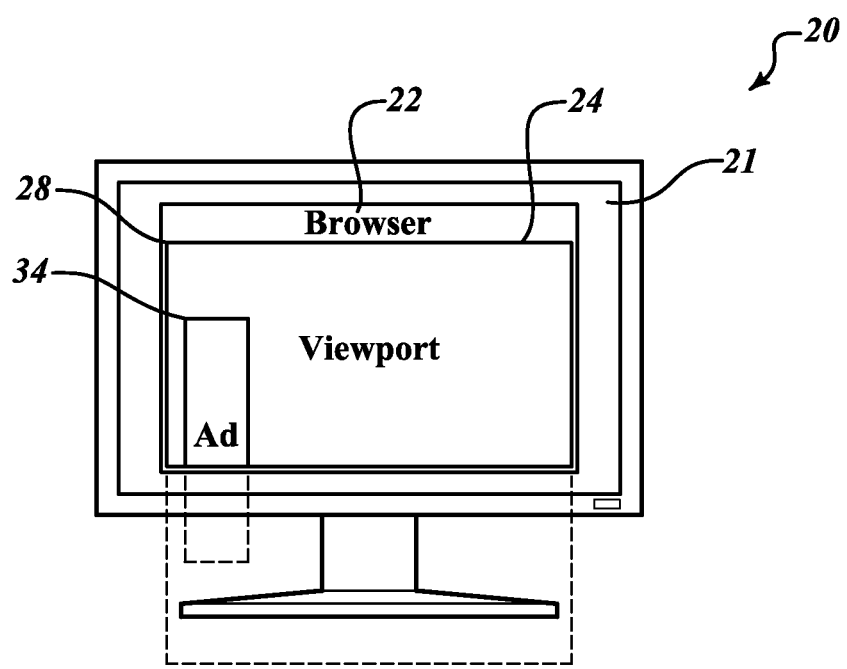
FIG. 2 illustrates a display showing the relationship of displayed features.

FIG. 2 illustrates a browser 22 presented on a display 20 of one of the user computer systems 12. The size of a screen area 21 of the display 20 is used as a basis of comparison against the size of the browser 22 to ensure that the browser 22 is fully visible. A viewport 24 is the total area within the browser 22 that is visible within the screen area 21. The viewport 24 is defined by upper left corner viewport x, y display dimensions 28. A web page is displayed at least partially within the viewport 24. Location of an Ad presented in the web page is identified by upper left corner x, y coordinates 34 and a total area of the Ad. The Ad is determined above the fold (i.e., visible) or below the fold (i.e., not visible) based on a defined percentage of the total Ad area in the viewport 24.

"User Engagement" is defined as a non-transient mouse cursor entry (see cursor 44) within an ad area 50. Non-transient is defined as a constant presence of the mouse cursor 44 within the ad area 50 for a pre-defined period of time, measured in milliseconds (e.g., 500 ms or between 100 ms and 1 sec). Additional mouse event types include a hover event (see cursor 46), a click event (see cursor 42), and a mouse exit event (see cursor 48).

There are multiple forms of user engagement captured by present invention (see FIG. 2):

InitialMouseEnter
    The mouse cursor has entered any region within the creative area and provides x,y coordinates of the entry location. The event will only log after a pre-configured period (default 500 ms) has passed to prevent transient event capture. This specific event is recorded only once per user impression.

MouseEnter
    The mouse cursor has entered any region within the creative area and provides x,y coordinates of the entry location. The event will only log after a pre-configured period (default 500 ms) has passed to prevent transient event capture. This event may occur multiple times per user impression and is reported upon every re-entry of the mouse cursor into the ad area.

MouseHover
    This logs an event when the mouse cursor x, y location has been constant within the ad area for a period exceeding a pre-configured period (default 500 ms) has passed and provides x, y coordinates of the hover location and the duration of time in seconds the mouse cursor x, y location was fixed/idle.

MouseClick
Provides x, y coordinates of a mouse click location and a time measurement capturing the total duration (in millisecond) since the preceding InitialMouseEnter or MouseEnter event, where applicable.

MouseExit
The mouse cursor has exited the ad area and reports the x, y coordinates of the exit location. This event also reports a time measurement capturing the total duration (in millisecond) that the mouse was in the ad area.

Figure 3:
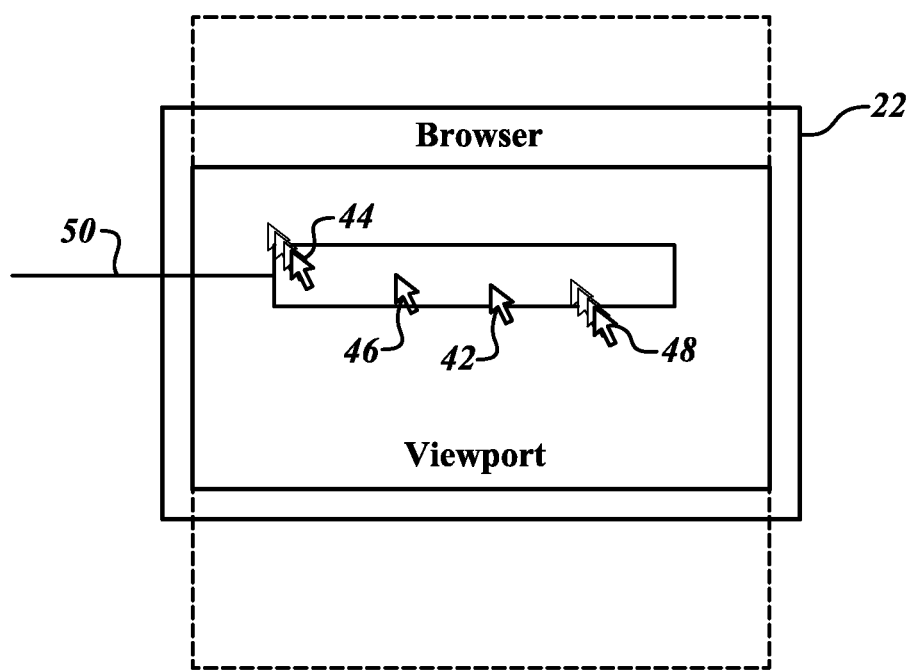
FIG. 3 illustrates cursor actions relative to an Ad unit.
Figures 1, 4:
Figures 2, 4:
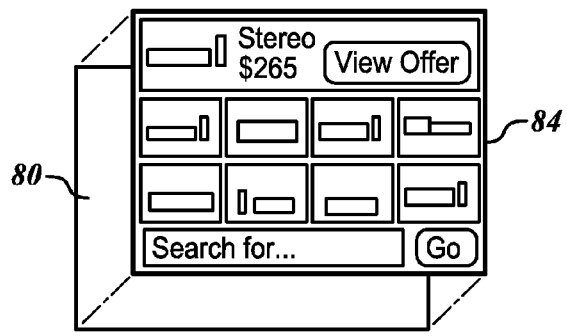
Figures 3, 4:
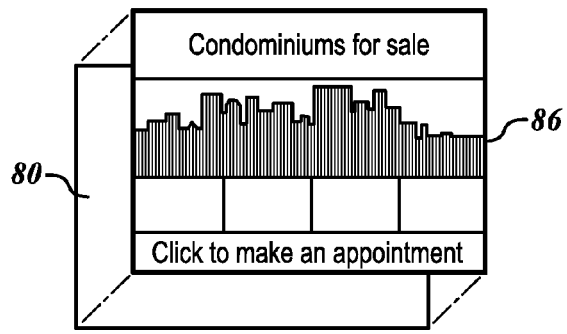

As shown in FIGS. 4-1 thru 4-3, the present invention includes the retrieval of Javascript and Flash code that is required to render an Ad Container that is capable of generating user engagement events. The retrieved code captures the above described events. In one embodiment, the code includes proprietary code that identifies a canvas model 80 upon which third-party ad creatives 82-86 are layered. In one embodiment, the canvas model 80 is a JavaScript and flash application that allows any type of ad creative 82-86 (image/JPG/GIF/PNG, video, rich Media/Flash, etc.) to be monitored in such a way that the canvas model 80 is capable of capturing all mouse events within the ad creative area. The hosted file reference (URL) to the third-party ad creative ("ad") is passed as a parameter to the proprietary flash canvas in such a way that the ad is completely independent of the canvas and no prior integration with the canvas is required. Essentially, the ad creative is "loaded into" the canvas at the time the entirety of the ad code is loaded by the browser.

Although the canvas model 80 is capable of seeing and capturing mouse events, there is no interruption or interference with the ad creative, such that the third-party ad creative developer is not restricted in any way in terms of developing a fully-interactive ad creative. In the canvas model, all user mouse interaction with the ad creative is captured by the canvas and reported to one or more of the server(s) 16, 18, 19.

FIG. 5 illustrates a flowchart of an example process 100 performed by the system 10 shown in FIG. 1. First, at a block 104, an Ad unit and associated canvas model are retrieved from their respective network locations and the Ad unit is rendered in the associated webpage. At a block 108, once the canvas model has determined that a user controlled cursor enters the boundaries of the ad (ad area as defined by the canvas model), a timer is started. Then at a decision block 110, the process 100 returns to block 108 to restart the timer if the cursor exits the ad area before the timer has reached a predefined threshold (e.g., 500 ms). If the predefined threshold has expired and the cursor has not exited the ad area, then at a block 114 an InitialMouse event is recorded. Then at a decision block 116, it is determined if the cursor stops inside the ad area for more than a second predefined threshold (e.g., 500 ms). If the condition of decision block 116 is true, then a hover timer begins at a block 120 (inclusive of the predefined threshold). At a block 122, if the cursor moves, or the associated browser changes in a significant way or closes, a hover event and the hover time are recorded. At a decision block 126, it is determined if a click action (i.e., selection) has occurred. If a click action has been determined to occur, then a click event and click time (click time is an offset between the prior MouseEnter event and the click event) are recorded at a block 128. After block 128 and if the condition of block 126 is not met, then, at a block 132, a cursor exit event and the time started at block 108 are recorded.

At a block 134, all recorded events and time (i.e., raw data) are reported back to the ad server(s) 16-19 for every ad impression delivered to a publisher site page and stored in event logs. The server(s) 16-19 performs a Map/Reduce process to convert the received raw data into a reporting database format. The data, once processed, reports a set (e.g. traditional Impressions, Clicks, Click-through Rate (CTR), and Total Unique Visitors (Uniques)) of statistics in the form of:

Engaged
Based on the InitialMouseEnter event, this is a measurement of all occurrences of a "first-time" mouse cursor movement within the ad area, exceeding the specified minimum duration (500 ms).

Engaged Percent
A ratio determined by dividing the total Engaged count by total impressions.

Total Engagement Time
An aggregation of all mouse-cursor presence within the ad area for a specific ad impression. This can include multiple mouse cursor interactions within the ad area for a single impression.

Average Engagement Time
A ratio determined by total engagement time divided by total engaged.

Total MouseEnters
In the case where the cursor exits the ad area and then later re-engages the ad area for a single impression, a total of all additional mouse enter events after the InitialMouseEnter event is counted as a MouseEnter event.

Average Enters per engagement
In the case where the cursor exits the ad area and then later re-engages the ad area for a single impression, the total MouseEnters per impression is divided by the total Engaged count.

Average Time Engaged until Click
In cases where a single cursor impression results in a click action within the ad area, the current total engagement time (time from InitialMouseEnter to Click) up to the click event is captured. The total of these times is then divided by total clicks.

Clicks
A total of all mouse click events within the ad area.

Click through Rate
Total clicks divided by total Impressions.

Engagement Click Through Rate
Total clicks divided by total Engaged.

Total Hovers
A count of the total number of mouse cursor hover events within the ad area. Each hover event also reports the hover time.

Average Time Hovered
The total of all hover time divided by total hovers.

Average Hovers per Engagement
The total of all hovers divided by total Engaged.

Average Hovers until Click
The total of all hovers divided by clicks.

The term mouse refers to any device that controls operation of a displayed cursor.

For every event, the following elements are reported to one of the server(s) 16-19 as parameter values:

uid: The UIDToken representing the unique identifier for this specific Ad Container in the reporting database;

swfname: The name of the creative (ex: wbtw_728×90) (see below for custom creative use-cases);

eventcode: The event code identifying the specific event being logged. A list of these codes are below;

location: The page URL where the ad placement resides;

wh: The width and height of the browser viewport;

xy: The coordinates of the item within the viewport or the mouse coordinates, depending on placement or creative eventcode type;

cid: CampaignID—An optional arbitrary value that is forwarded from a "cid" param passed to the ad code as a parameter value;

vchannel: ChannelID—An optional arbitrary value that is forwarded from a "vchannel" param passed to the ad code as a parameter value;

publisher: Publisher Identifier—An optional value that identifies the partner network, and is forwarded from a "publisher" param passed to the ad code as a parameter value;

pageurl: PageURL—An optional value to explicitly specify the hosting page, and is forwarded from a "pageurl" param passed to the ad code as a parameter value;

duration: A value, in milliseconds, measuring a time interval for the event type; and t: a unique value to validate the event.

Publisher and pageurl parameters are intended to be populated through the use of third-party ad network "macros", which substitute a pre-defined keyword string with an applicable runtime value. For example, the RMX macros for publisher and pageurl are $ {PUBLISHERID} and $ {SOURCEURLENC}, respectively.

The following elements are only included with the AdImpression event as extended elements, as defined in the last column of FIG. 6:

iframed: Boolean value indicating whether the placement is enclosed in an iFrame;

cookieenabled: Boolean value indicating whether cookies are enabled in the browser;

screenwh: The resolution of the monitor that the user is using;

screenavailwh: The available screen real estate, minus menu bars and such;

colordepth: 8, 16, or 24 in most cases;

flash: The version number of Flash Player if the user has Flash installed, or absent if they don't;

user-agent: The browser user-agent value is passed as an HTTP Header element in the adImpression event;

cookie-id: The cookie-id value is passed as a header element in the api request header rather than as a parameter. The event logger also checks for the presence of a cookied user identifier. If it's present, it'll log it. If it's absent, it'll generate a new user identifier, log it, and set a cookie on the client. The name of this cookie is "evlu".

FIG. 6 is a chart that shows the data elements and their applicability to each event.

The following is a sample of Standard Flash Object Code, as it would typically exist without the invention, with example Ad Server Macro elements (as indicated by content with the brackets [ ]) referenced:

```
<object height="[ADHEIGHTMACRO]" width="[ADWIDTHMACRO]"
id="[ADIDMACRO]"><param value="[CREATIVEURLMACRO]"
name="movie"><param value="clickTag=[CLICKURLMACRO]"
name="FlashVars"><param value="high" name="quality"><param
value="opaque" name="wmode"><param value="always"
name="allowScriptAccess"><embed height="[ADHEIGHTMACRO]"
width="[ADWIDTHMACRO]" type="application/x-shockwave-flash"
loop="true" salign="LT" quality="high"
movie="[CREATIVEURLMACRO]"
allowscriptaccess="always"></object>
```

In contrast, the invention's equivalent code appears as below, with the same example Ad Server Macro elements referenced:

```
<script type="text/javascript">
__ADXPOSE__PREFS__ = {
uid: "xxxxxxxxxxxxxx_[ADIDMACRO]",
cid: "[CAMPAIGNIDMACRO]",
clicktag: "",
vchannel: "",
pageurl: "",
publisher: "",
curl: encodeURIComponent("[CREATIVEURLMACRO]"),
altcurl: encodeURIComponent("[ALTCREATIVEURLMACRO]"),
ourl: encodeURIComponent("[CLICKURLMACRO]"),
version: 2,
altbannerurl: encodeURIComponent(""),
transparent: false,
width: [ADWIDTHMACRO],
height: [ADHEIGHTMACRO]
}
</script>
<script src="http://servedby.adxpose.com/adxpose/write_ad.js"
type="text/javascript" charset="utf-8"></script>
<script type="text/javascript">document.write('<scr'+'ipt
src="http://ads.adxpose.com/ads/ads.js?uid='+encodeURIComponent('
xxxxxxxxxxxxxx_[ADIDMACRO]')+'" type="text/javascript"
charset="utf-8"></scr'+'ipt>') </script><noscript>......ad server noscript
block......</noscript>
```

The above invention's version of the code adopts the same usage of the traditional ad server macro references, but uses them specifically with the invention's code to pass these ad server values as attributes into the invention's Javascript and Flash code. The entirety of the invention's code replaces the traditional Ad Container code.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiment of the invention in which an exclusive property or privilege is claimed are defined as follows:

1. A method for capturing user engagements with Ad content included in a webpage, the method comprising:
   at a computer having a display and coupled to a network:
      retrieving the webpage and code corresponding to a canvas model ad container that is independent from a third-party ad unit and requires no prior integration with the third-party ad unit;
      replacing at least one ad container code in the webpage with the code corresponding to the canvas model ad container, wherein the at least one ad container code comprises an ad height macro and an ad width macro;
      loading a third-party ad unit into the canvas model ad container at the time the entirety of the third-party ad unit is loaded by a browser and passing a runtime value referencing a URL of the third-party ad unit as a parameter to the canvas model ad container and setting a height and a width of the canvas model ad container based on the ad height macro and the ad width macro by passing the ad height macro and the ad width macro as attributes into the code corresponding to the canvas model ad container;
      defining a canvas model area within the webpage on the display corresponding to the height and the width of the canvas model ad container;

rendering the third-party ad unit in the webpage and identifying the canvas model area corresponding to the third-party ad unit;

comparing coordinates of a cursor event, corresponding to the third-party ad unit, to the canvas model area;

recording the coordinates of the cursor event; and transmitting the cursor event to a server via the network.

2. The method of claim 1, wherein the cursor event comprises an initial cursor entry event based on a first entry of the cursor into the canvas model area since the webpage was rendered.

3. The method of claim 2, wherein the initial cursor entry event is recorded only if the cursor was located in the canvas model area for greater than a first threshold of time.

4. The method of claim 1, wherein the cursor event comprises an amount of time the cursor was located in the canvas model area.

5. The method of claim 1, further comprising capturing any click events associated with the cursor while the cursor was located in the canvas model area and associated time values.

6. The method of claim 1, further comprising capturing a hover event and associated time values based on lack of movement of the cursor within the canvas model area for a predefined threshold of time.

7. The method of claim 1, wherein capturing is further based on location information associated with the browser within the display, the webpage within the browser and the canvas model area within the webpage.

8. A computer device for capturing user engagements with Ad content included in a webpage, the computer device comprising:

a display; and a processor coupled to the display and a network, wherein the processor performs a method comprising:

retrieving the webpage and code corresponding to a canvas model ad container that is independent from a third-party ad unit and requires no prior integration with the third-party ad unit;

replacing at least one ad container code in the webpage with the code corresponding to the canvas model ad container, wherein the at least one ad container code comprises an ad height macro and an ad width macro;

loading a third-party ad unit into the canvas model ad container at the time the entirety of the third-party ad unit is loaded by a browser and passing a runtime value referencing a URL of the third-party ad unit as a parameter to the canvas model ad container and setting a height and a width of the canvas model ad container based on the ad height macro and the ad width macro by passing the ad height macro and the ad width macro as attributes into the code corresponding to the canvas model ad container;

defining a canvas model area within the webpage on the display corresponding to the height and the width of the canvas model ad container;

rendering the third-party ad unit in the webpage and identifying the canvas model area corresponding to the third-party ad unit;

comparing coordinates of a cursor event, corresponding to the third-party ad unit, to the canvas model area;

recording the coordinates of the cursor event; and transmitting the cursor event to a server via the network.

9. The device of claim 8, wherein the cursor event comprises an initial cursor entry event based on a first entry of the cursor into the canvas model area since the webpage was rendered.

10. The device of claim 9, wherein the method further comprises recording the initial cursor entry event only if the cursor was located in the canvas model area for greater than a first threshold of time.

11. The device of claim 8, wherein the cursor event comprises an amount of time the cursor was located in the canvas model area.

12. The device of claim 8, wherein the method further comprises capturing any click events associated with the cursor while the cursor was located in the canvas model area and associated time values.

13. The device of claim 8, wherein the method further comprises capturing a hover event and associated time values based on lack of movement of the cursor within the canvas model area for a predefined threshold of time.

14. The device of claim 8, wherein the method further comprises capturing the cursor event based on location information associated with the browser within the display, the webpage within the browser and the canvas model area within the webpage.

15. A non-transitory computer-readable storage medium comprising instructions that cause one or more processors to perform a method comprising:

at a computer having a display and coupled to a network:

retrieving the webpage and code corresponding to a canvas model ad container that is independent from a third-party ad unit and requires no prior integration with the third-party ad unit;

replacing at least one ad container code in the webpage with the code corresponding to the canvas model ad container, wherein the at least one ad container code comprises an ad height macro and an ad width macro;

loading a third-party ad unit into the canvas model ad container at the time the entirety of the third-party ad unit is loaded by a browser and passing a runtime value referencing a URL of the third-party ad unit as a parameter to the canvas model ad container and setting a height and a width of the canvas model ad container based on the ad height macro and the ad width macro by passing the ad height macro and the ad width macro as attributes into the code corresponding to the canvas model ad container;

defining a canvas model area within the webpage on the display corresponding to the height and the width of the canvas model ad container;

rendering the third-party ad unit in the webpage and identifying the canvas model area corresponding to the third-party ad unit;

comparing coordinates of a cursor event, corresponding to the third-party ad unit, to the canvas model area;

recording the coordinates of the cursor event; and transmitting the cursor event to a server via the network.

16. The non-transitory computer-readable storage medium of claim 15, wherein the cursor event comprises an initial cursor entry event based on a first entry of the cursor into the canvas model area since the webpage was rendered.

17. The non-transitory computer-readable storage medium of claim 16, wherein the initial cursor entry event is recorded only if the cursor was located in the canvas model area for greater than a first threshold of time.

18. The non-transitory computer-readable storage medium of claim 15, wherein the cursor event comprises an amount of time the cursor was located in the canvas model area.

19. The non-transitory computer-readable storage medium of claim 15, wherein the method further comprises:

capturing any click events associated with the cursor while the cursor was located in the canvas model area and associated time values; and capturing a hover event and associated time values based on lack of movement of the cursor within the canvas model area for a predefined threshold of time.

20. The non-transitory computer-readable storage medium of claim 15, wherein capturing is further based on location information associated with the browser within the display, the webpage within the browser and the canvas model area within the webpage.

\* \* \* \* \*